United States Patent
Chmielewski et al.

(10) Patent No.: US 11,598,240 B2
(45) Date of Patent: Mar. 7, 2023

(54) SYSTEMS AND METHODS FOR ESTIMATING DIESEL EXHAUST FLUID VOLUME

(71) Applicant: Ford Global Technologies, LLC, Dearborn, MI (US)

(72) Inventors: Thaddeus A Chmielewski, Beverly Hills, MI (US); Gurpreet Matharu, Dearborn, MI (US); Marcus Bengtsson, Dearborn, MI (US); Carlos Armesto, Canton, MI (US); Bret Alan Zimmerman, Grosse Pointe, MI (US); Jim Bromham, Trowbridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/220,815

(22) Filed: Apr. 1, 2021

(65) Prior Publication Data
US 2022/0316375 A1 Oct. 6, 2022

(51) Int. Cl.
*F01N 3/20* (2006.01)

(52) U.S. Cl.
CPC .......... *F01N 3/208* (2013.01); *F01N 2610/02* (2013.01); *F01N 2610/105* (2013.01); *F01N 2610/144* (2013.01); *F01N 2610/1406* (2013.01); *F01N 2610/146* (2013.01); *F01N 2610/1486* (2013.01); *F01N 2900/1811* (2013.01); *F01N 2900/1814* (2013.01)

(58) Field of Classification Search
CPC ................ F01N 3/208; F01N 2610/02; F01N 2610/105; F01N 2610/1406; F01N 2610/146; F01N 2610/1486; F01N 2610/144; F01N 2900/1811; F01N 2900/1814; G01C 21/20; G01C 21/3848; G03G 5/0507; G03G 5/0525; G09B 29/005; G09B 29/02; Y02A 50/20; Y02T 10/12
See application file for complete search history.

(56) References Cited

U.S. PATENT DOCUMENTS

| | | | |
|---|---|---|---|
| 9,556,774 B2 | 1/2017 | Hodgson et al. | |
| 10,267,203 B2 | 4/2019 | Khaled | |
| 2011/0139255 A1 | 6/2011 | Gouriet et al. | |
| 2015/0197134 A1* | 7/2015 | Carter | F01P 11/04 165/41 |
| 2017/0305264 A1* | 10/2017 | Haeberer | B60K 15/03 |
| 2020/0309012 A1 | 10/2020 | Rolland et al. | |

FOREIGN PATENT DOCUMENTS

| | | |
|---|---|---|
| FR | 3068779 A1 | 1/2019 |
| WO | 2019059830 A1 | 3/2019 |

* cited by examiner

*Primary Examiner* — Phutthiwat Wongwian
*Assistant Examiner* — Diem T Tran
(74) *Attorney, Agent, or Firm* — Vincent Mastrogiacomo; McCoy Russell LLP

(57) ABSTRACT

Methods and systems are provided for estimation of a volume of liquid diesel exhaust fluid (DEF) contained within a DEF tank. In one example, a method for the estimation of the volume of liquid DEF in a DEF tank during DEF freezing conditions may include activating a heater contained within the DEF tank, and then switching estimation of the volume of liquid DEF via a first transfer function to estimation of the volume of liquid DEF via a second transfer function.

5 Claims, 4 Drawing Sheets

SYSTEMS AND METHODS FOR ESTIMATING DIESEL EXHAUST FLUID VOLUME

FIELD

The present description relates generally to methods and systems for estimating a volume of diesel exhaust fluid (DEF) in a liquid state.

BACKGROUND/SUMMARY

A selective catalytic reduction (SCR) system may be included in an engine exhaust system to remove or reduce nitrous oxide (NOx or NO) produced as a byproduct of combustion of an engine. SCR systems use reductants, such as Diesel Exhaust Fluid (DEF), that are introduced into the exhaust stream. In one example, DEF may include a urea-based chemical reactant used in the SCR to reduce emissions of nitrous oxide. DEF may be stored in a storage vessel, such as a tank, on board a vehicle and supplied from the tank to the exhaust system, upstream of the SCR, via a nozzle. In order to effectively reduce nitrous oxide, a steady supply of liquid DEF may be desired at the SCR.

During cold ambient conditions, a portion of DEF contained in the tank may freeze from a liquid state to a solid state. The frozen, solidified DEF is unusable for the purposes of nitrous oxide reduction. A heater coupled to the tank may be used to thaw a portion of the frozen DEF into a liquid state. The thawed volume of liquid DEF may then be estimated in order to determine if there is an adequate amount of liquid DEF in the tank for use by the SCR system.

One example approach for estimating a volume of the thawed reductant liquid in the tank is illustrated by Rolland et al. in U.S. Patent Application No. 2020/0309012. Therein, a first heat-energy transfer between contents of the tank and the external surroundings is determined, a second heat-energy transfer between a heating element and the contents of the tank is determined, and the volume of thawed liquid present in the tank is determined based on the first heat transfer and the second heat transfer.

However, the inventors herein have recognized potential issues with such systems. As one example, a heat transfer between the contents of the tank and the external surroundings may be a function of characteristics of the tank such as a shape and size of the tank, and therefore may have to be estimated differently for each type of tank used. A typical method to incorporate the characteristics of the tank, such as the shape and size of the tank, in an estimation the volume of liquid DEF in the tank is by use of a transfer function. During warmer conditions, when the entire volume of DEF in the tank is in liquid state (not frozen), the transfer function used to estimate volume of liquid DEF in a tank based on an estimated DEF height may not be accurate in estimating a volume of liquid DEF when a portion of the DEF in the tank is frozen. Inaccuracies in estimating available DEF during cold ambient conditions may lead to inaccurate diagnostics and unnecessary servicing of a DEF system. Further, inaccuracies in estimation of available DEF and absence of in-time refill of DEF may result in ineffective operation of the SCR catalyst. In one embodiment, the shape of the SCR tank may be modified to include a depression at the bottom of the tank wherein the tank heater may be housed to increase thawing of frozen DEF at the bottom of the tank. However, such design changes to the tank may cause reduction in overall tank capacity and increase manufacturing costs.

In one example, the issues described above may be addressed by a method for thawing diesel exhaust fluid in a vehicle, comprising: estimating a volume of liquid diesel exhaust fluid (DEF) in a tank for storing the DEF via a first function, and in response to freezing conditions in the tank, activating a heater coupled to the tank, and then transitioning to estimation of the volume of liquid DEF via a second function independent of a geometry and volume of the tank; and adjusting DEF injection based on the estimated volume of the liquid DEF. In this way, by using a first transfer function to estimate liquid DEF during warm ambient conditions and using a second, different transfer function to estimate liquid DEF during cold ambient conditions, accurate estimation of usable DEF may be carried out.

As one example, DEF contained in the tank may freeze during colder ambient (freezing) conditions. A heater may be coupled to a lower base of the tank to heat and thaw frozen DEF during the freezing conditions. Upon freezing of the DEF, as the heater is activated, the DEF may be thawed and a profile of liquid DEF within the tank may be based on characteristics of the heater. A height of liquid DEF may be estimated via a first sensor coupled to the DEF tank during warmer ambient conditions while the height of liquid (usable) DEF within a tank including frozen DEF during freezing conditions may be estimated via a second sensor coupled to the heater. During warmer conditions (such as when the DEF is not frozen), a first transfer function may be utilized to compute a volume of the DEF based on a height of the DEF estimated via the first sensor. During colder conditions (such as when the DEF is frozen), a second transfer function may be utilized to compute usable liquid DEF volume based on a DEF height estimated via the second sensor. The second transfer function may be based on a characteristic thawing pattern of DEF induced by the heater that is independent of characteristics of the tank (such as shape and size of the tank).

When the DEF is refilled in the tank, the transfer function used for estimating a volume of liquid DEF may be switched from the second to the first transfer function.

In this way, by utilizing a distinct transfer function for the liquid DEF volume estimation during freezing conditions based on thawing characteristics of a heater in the tank, a usable amount of liquid DEF in the tank may be accurately estimated. The technical effect of using a distinct transfer function based on heater characteristics is that in a fleet of vehicles with different tank shapes and sizes, if a same heater is used for DEF thawing, during freezing conditions, the same transfer function may be used to estimate an available volume of liquid, usable DEF. This may allow for accurate estimation of the volume of DEF contained within a DEF tank regardless of properties of the DEF tank (such as size and shape of the tank). By accurately estimating liquid DEF volume during freezing conditions in a way that is independent of the tank characteristics, designs for tanks may be simplified. Further, obtaining a more accurate estimate of the volume of liquid DEF during freezing conditions may allow for more accurate diagnostics, minimizing the potential for unnecessary servicing. Overall, by accurately estimating the volume of liquid DEF in the tank during all conditions, optimal operation of the SCR catalyst may be maintained and emissions may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
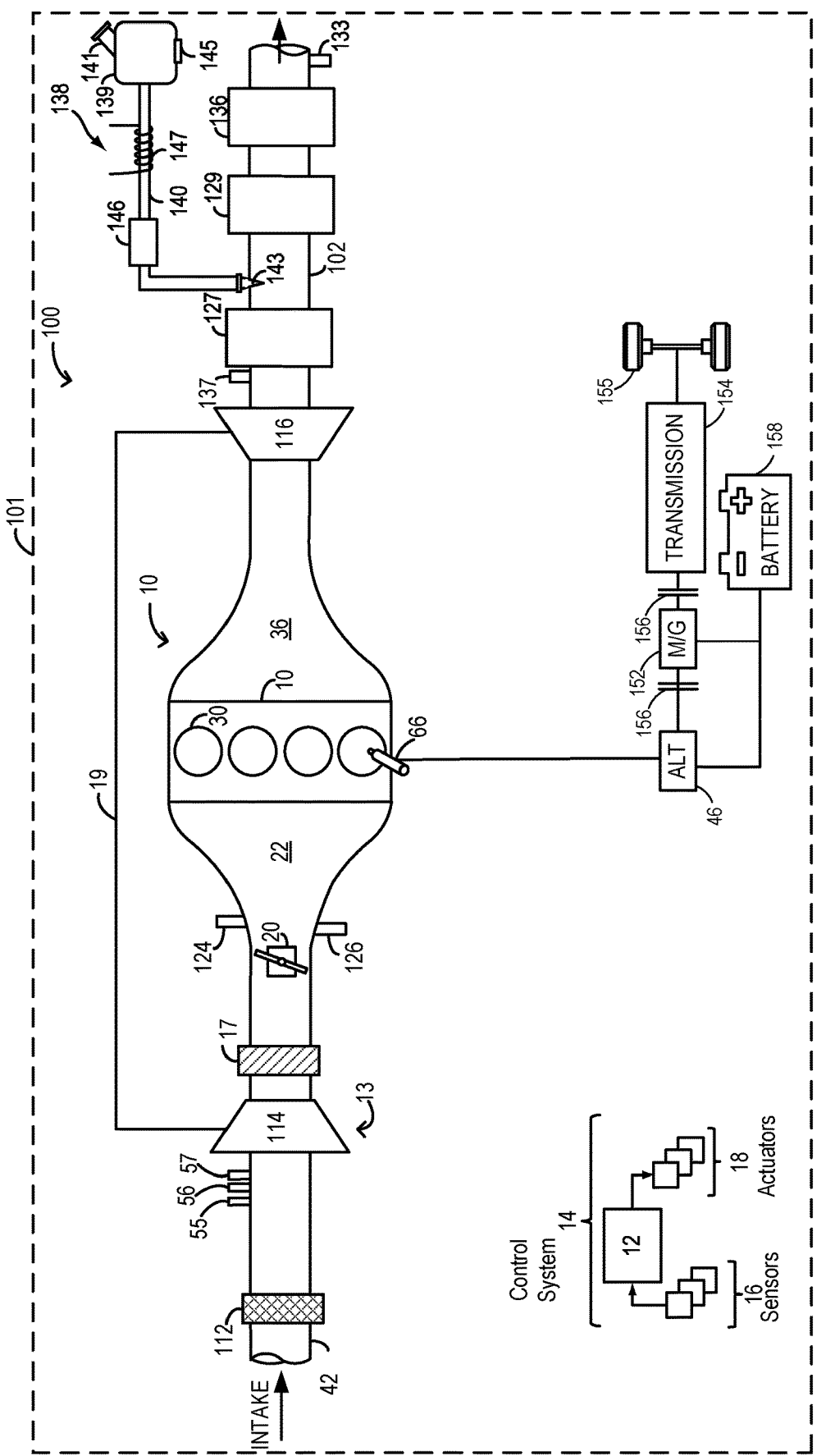
FIG. 1 shows a schematic diagram of an example engine system including a selective catalytic reduction (SCR) catalyst and a diesel exhaust fluid (DEF) system.
Figure 2:
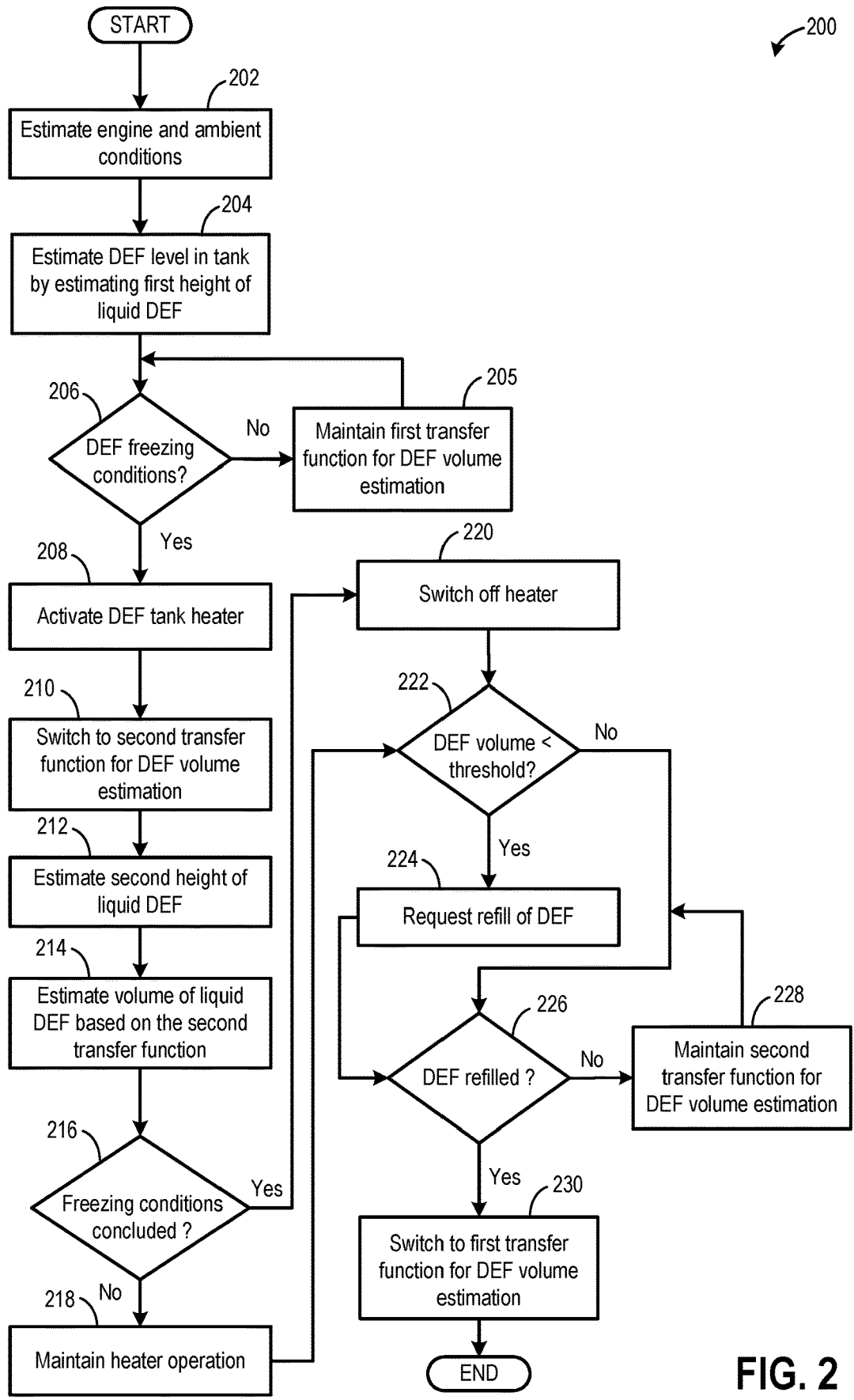
FIG. 2 shows a flowchart for an example method for estimating a volume of liquid DEF contained with a DEF tank.
Figure 3A:
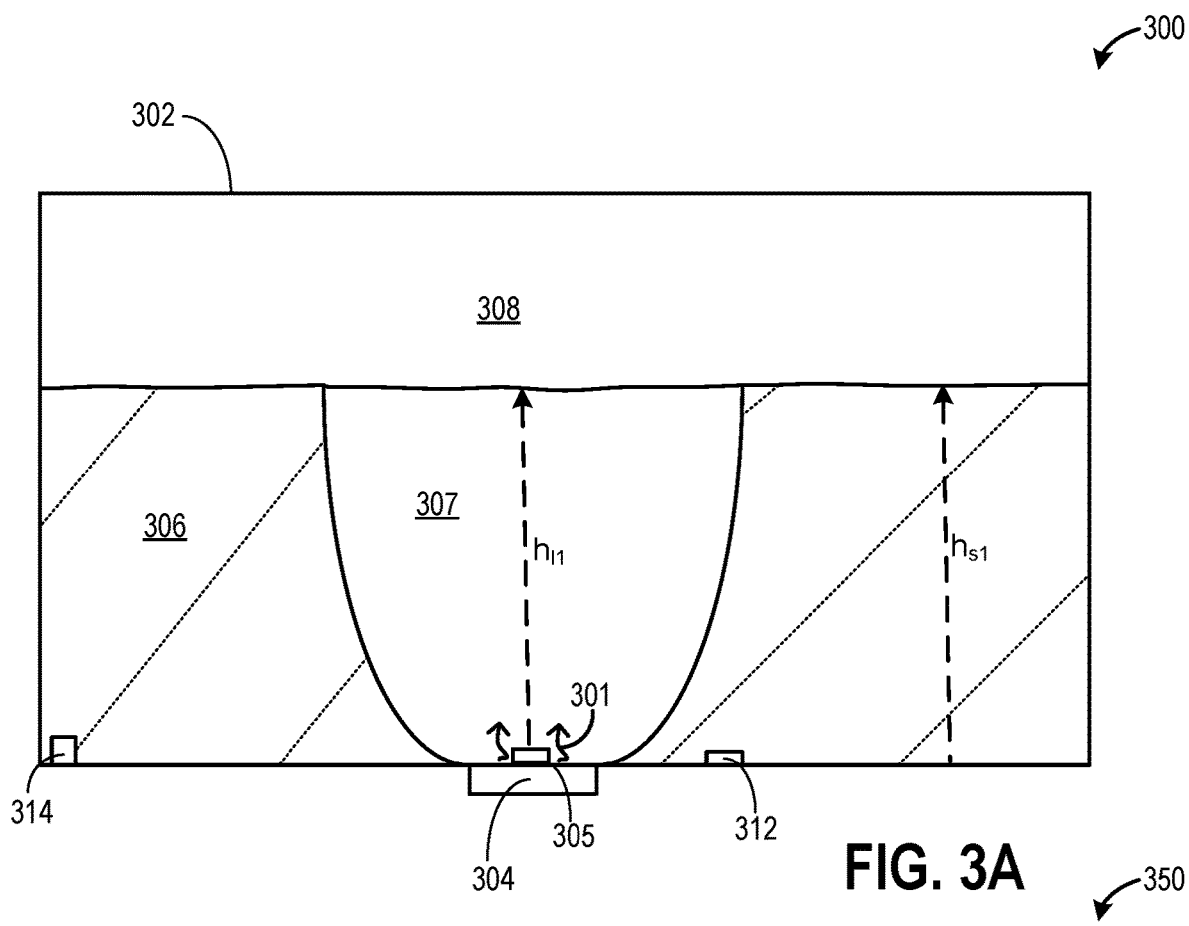
FIG. 3A shows a schematic of a first example DEF tank.
Figure 3B:
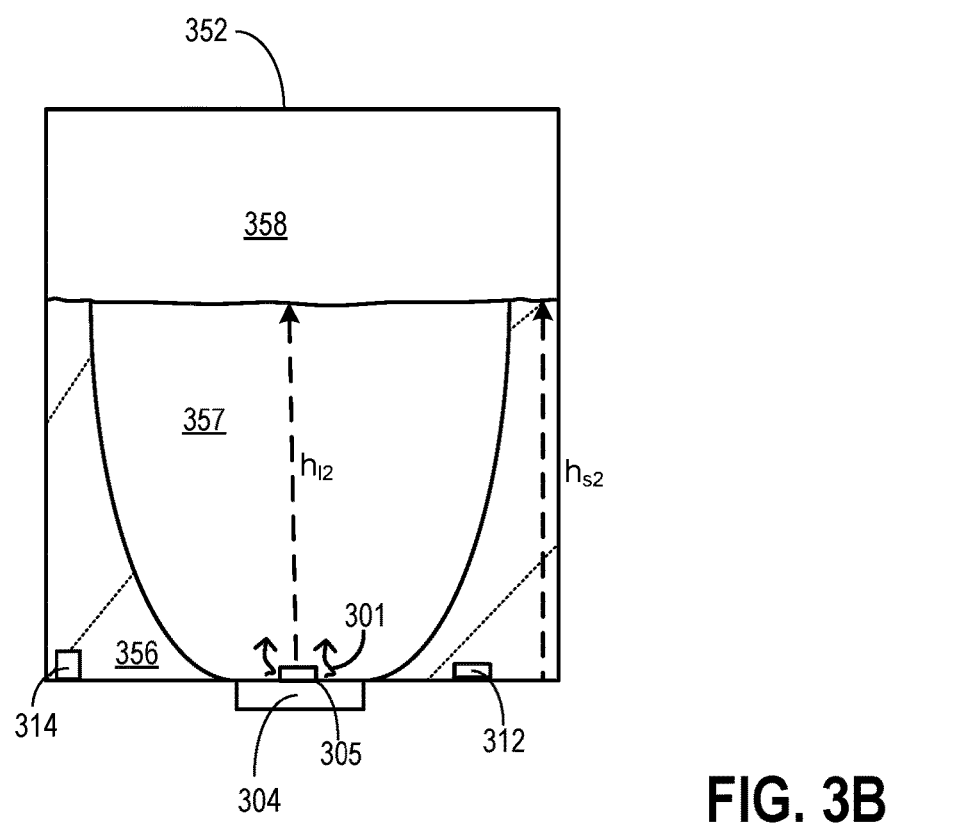
FIG. 3B shows a schematic of a second example DEF tank.
Figure 4:
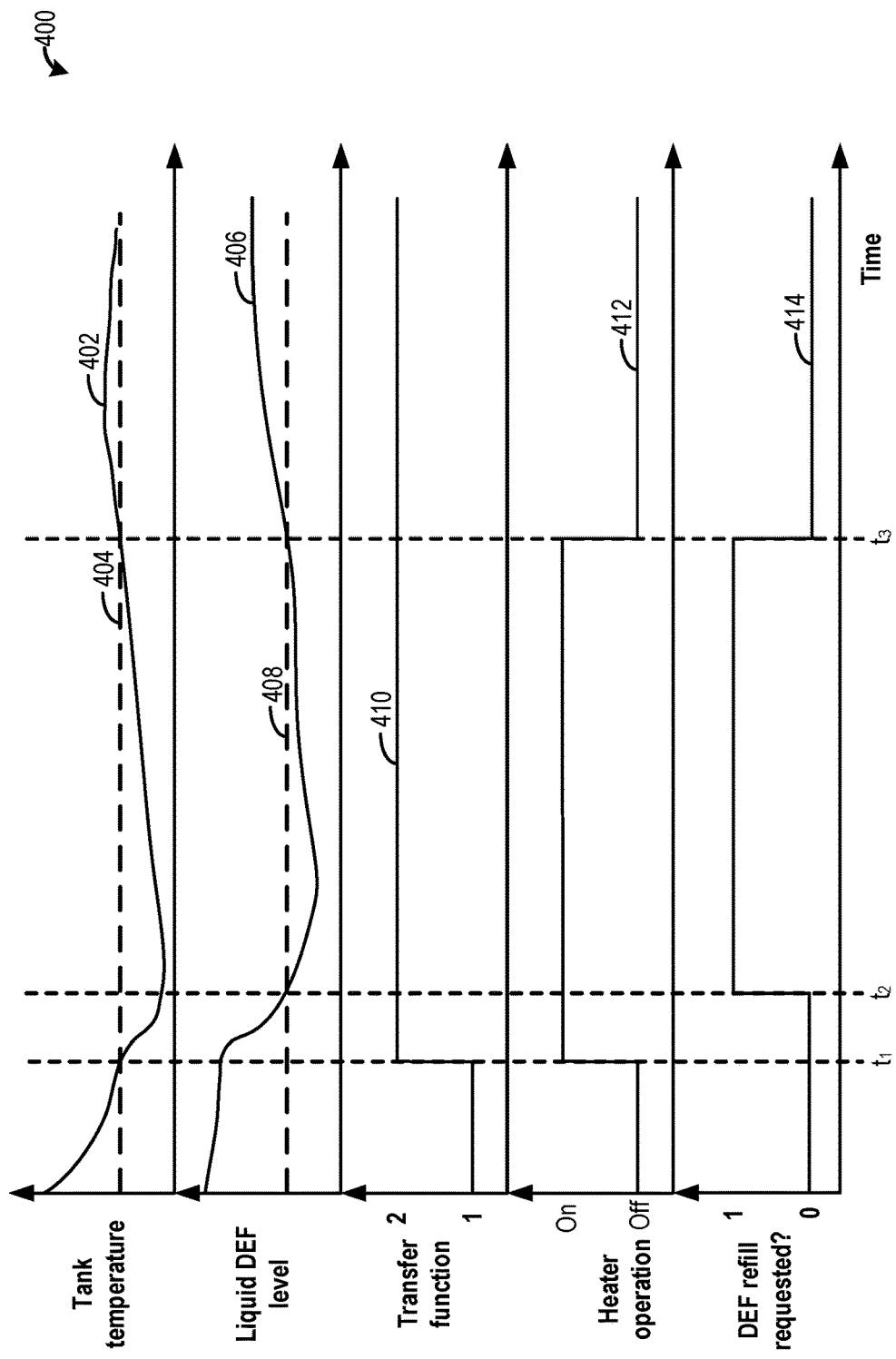
FIG. 4 shows an example timeline for determining the volume of liquid DEF in a tank, according to the present disclosure.

The following description relates to systems and methods for estimating liquid diesel exhaust fluid (DEF) volume in a tank. A SCR catalyst and a DEF system supplying DEF to the SCR catalyst may be included in an example engine system, as shown in FIG. 1. The volume of the liquid DEF under freezing conditions may be determined based on a thawing pattern of the DEF as caused by heating the tank via a heater contained within the DEF tank. The method for estimating the volume of liquid DEF contained within the DEF tank, which may utilize distinct transfer functions based on temperature conditions, is shown in FIG. 2. FIG. 3A and FIG. 3B show two example embodiments of DEF tanks, including a parabolic thawing patterns of DEF induced by heaters housed at the bottom of the tanks. FIG. 4 shows an example timeline for estimating liquid DEF volume (also referred to herein as liquid DEF level) based on temperature conditions including the transfer function being utilized.

FIG. 1 schematically shows aspects of an example vehicle system 101 including an engine system 100. In the depicted embodiment, an engine 10 of the engine system 100 is a boosted engine coupled to a turbocharger 13 including a compressor 114 driven by a turbine 116. The exhaust turbine 116 may be configured as a variable geometry turbine (VGT). Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

The compressor 114 may be coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. A compressor recirculation passage (not shown) may be provided for compressor surge control. Specifically, to reduce compressor surge, such as on a driver tip-out, boost pressure may be dumped from the intake manifold, downstream of the CAC 17 and upstream of throttle valve 20, to intake passage 42. By flowing boosted air from upstream of an intake throttle inlet to upstream of the compressor inlets, boost pressure may be rapidly reduced, expediting boost control.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions.

In some examples, intake manifold 22 may include an intake manifold pressure sensor 124 for estimating a manifold pressure (MAP) and/or an intake air flow sensor 126 for estimating a mass air flow (MAF) in the intake manifold 22. Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as required for desired combustion and emissions-control performance.

Combustion chambers 30 may be supplied one or more fuels, such as gasoline, alcohol fuel blends, diesel, biodiesel, compressed natural gas, etc., via fuel injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. Downstream of the turbine is exhaust passage 102, which allows exhaust to flow to the atmosphere, and along which there may be one or more exhaust emission devices. In general, exhaust emission devices (e.g. 127, 129, 136) may include one or more exhaust after-treatment catalysts configured to catalytically treat the exhaust flow, and thereby reduce an amount of one or more substances in the exhaust flow. Exhaust passage 102 may also be coupled to a reductant delivery and storage system, such as diesel exhaust fluid (DEF) system 138.

The exhaust after-treatment catalysts may be disposed in various orders and/or combinations along exhaust passage 102. For example, a diesel oxidation catalyst (DOC) 127 may be followed downstream by a selective catalytic reduction (SCR) catalyst 129. SCR catalyst 129 may be followed downstream by a diesel particulate filter (DPF) 136. It should be understood that the emissions control devices shown in FIG. 1 are exemplary in nature. Various other emission control devices and configurations may be included along the exhaust passage 102. For example, exhaust passage 102 may include an SCR catalyst followed by a DPF. In another example, the exhaust passage 102 may include an SCR catalyst. In still another example, a DPF may be located upstream of the SCR catalyst, or a combined DPF/SCR catalyst may be used.

The exhaust passage 102 may further include a reductant delivery and/or storage system, such as DEF system 138. The DEF may be a liquid reductant, such as a urea and water mixture, stored in a storage vessel, such as a storage tank. In one example, the DEF system 138 may include DEF tank 139 for onboard DEF storage, a DEF line 140 that couples the DEF tank 139 to exhaust passage 102 via an injector at or upstream of SCR catalyst 129. The DEF may act as a reductant within the SCR catalyst 129, setting off a chemical reaction to reduce nitrous oxides (NOx or NO) into nitrogen, in addition to water and carbon dioxide byproducts. The DEF tank 139 may be of various forms, and may include a filler neck 141 and corresponding cap and/or cover door in the vehicle body. Filler neck 141 may be configured to receive a nozzle for replenishing DEF.

DEF system 138 may also include a DEF injector 143 in DEF line 140 which injects DEF into the exhaust upstream of the SCR catalyst 129. DEF injector 143 may be used to control the timing and amount of DEF injections, via control system 14. DEF system 138 may further include DEF pump 146. DEF pump 146 may be used to pressurize and deliver DEF from the DEF tank 139 into DEF line 140. DEF system 138 may further include a DEF line heater 147 which heats DEF line 140. For example, the DEF line heater 147 may warm the DEF fluid on the way to the DEF pump at low temperatures in order to maintain a DEF fluid viscosity. DEF line heater 147 may be a resistive heater, or various other configurations. A heater 145 may be housed in the DEF tank 139 to heat DEF under freezing ambient conditions. Alternatively, heater 145 may be placed externally to DEF tank 139 (such as with face sharing contact with the bottom of DEF tank 139). Power to operate the line heater 147 and the tank heater 145 may be supplied from an on-board battery such as battery 158.

Activation of the heater 145 coupled to DEF tank 139 may be in conjunction with transitioning estimation of liquid DEF volume in the tank via a first function to estimation of the liquid DEF volume via a second function. Further, activation of the heater 145 may be in response to freezing conditions determined based on a lower than threshold temperature of the DEF tank 139, causing at least a part of the DEF stored in the tank to freeze. Operation of the heater 145 may thaw frozen DEF in the tank in a substantially parabolic profile (such as within 5% margin), regardless of a shape and size of the tank.

In an absence of freezing conditions, estimation of the liquid DEF volume in the DEF tank 139 via the first function may be based on a first height of DEF in the DEF tank 139 as estimated via a first sensor (as discussed in relation to FIGS. 3A-B). In the presence of freezing conditions, estimation of the liquid DEF volume in the DEF tank 139 via the second function may be based on a second height of thawed liquid DEF in the DEF tank 139 via a second sensor (as discussed in relation to FIGS. 3A-B) coupled to the heater 145, where the second height is a distance between the heater 145 and a top surface of thawed liquid DEF in the DEF tank 139. The first function may be pre-calibrated based on a size and shape of DEF tank 139, whereas the second function may be pre-calibrated based on a heating profile of the heater 145, the heating profile including an intensity of heat supplied by a heating element of the heater.

If freezing conditions are concluded, the heater 145 may be deactivated while continuing estimation of liquid DEF volume in the DEF tank 139 via the second function. In response to transitioning estimation of liquid DEF volume via the second function, an operator may be notified of a change in liquid DEF volume, and in response to the liquid DEF volume in the DEF tank 139 reducing to below a threshold volume, the operator may be further notified to refill the DEF tank 139. If a DEF refill event occurs, estimation of liquid DEF volume in the DEF tank 139 via the second function may transition to estimation of the liquid DEF volume via the first function.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include MAP sensor 124, MAF sensor 126, exhaust temperature sensor 133, exhaust gas sensor 137, compressor inlet temperature sensor 55, compressor inlet pressure sensor 56, compressor inlet humidity sensor 57, crankshaft sensor, pedal position sensor, and engine coolant temperature sensor. Other sensors such as additional pressure, temperature, air/fuel ratio, and composition sensors may be coupled to various locations in engine system 100. The actuators 18 may include, for example, throttle valve 20, and fuel injector 66. The control system 14 may include a controller 12. The controller 12 may receive input data from the various sensors, process the input data, and trigger various actuators in response to the processed input data based on instruction or code programmed therein corresponding to one or more routines.

In some examples, vehicle system 101 may be a hybrid vehicle with multiple sources of torque available to one or more vehicle wheels 155. In other examples, vehicle system 101 is a conventional vehicle with an engine, or an electric vehicle with electric machine(s). In the example shown, vehicle system 101 includes engine 10 and an electric machine 152. Electric machine 152 may be a motor or a motor/generator. A crankshaft of engine 10 and electric machine 152 are connected via a transmission 154 to vehicle wheels 155 when one or more clutches 156 are engaged. In the depicted example, a first clutch 156 is provided between crankshaft and electric machine 152, and a second clutch 156 is provided between electric machine 152 and transmission 154. Controller 12 may send a signal to an actuator of each clutch 156 to engage or disengage the clutch, so as to connect or disconnect crankshaft from electric machine 152 and the components connected thereto, and/or connect or disconnect electric machine 152 from transmission 154 and the components connected thereto. Transmission 54 may be a gearbox, a planetary gear system, or another type of transmission. The powertrain may be configured in various manners including as a parallel, a series, or a series-parallel hybrid vehicle.

Electric machine 152 receives electrical power from a traction battery 58 to provide torque to vehicle wheels 155. Electric machine 152 may also be operated as a generator to provide electrical power to charge battery 158, for example during a braking operation.

In this way, the systems in FIG. 1 provide for a selective catalytic reduction (SCR) system, a tank housing diesel exhaust fluid (DEF) for delivery to the SCR system, and a controller storing instructions in non-transitory memory that, when executed, cause the controller to: during a first condition, estimate a volume of DEF in the tank based on a first height of liquid DEF relative to a base of the tank and a first transfer function, the first transfer based on a geometry of the tank, and during a second condition, estimate the volume of DEF in the tank based on a second height of liquid DEF relative to a heater and a second transfer function, the second transfer function independent of the geometry of the tank. The first condition may include one or more of a higher than threshold tank temperature and a higher than threshold ambient temperature, and the second condition may include one or more of a lower than threshold tank temperature and a lower than threshold ambient temperature.

FIG. 2 shows a flow chart for an example method 200 for determining a volume of usable, liquid DEF in a DEF tank (such as DEF tank 139 of FIG. 1). Method 200 will be described in reference to the systems described herein and with regard to FIG. 1, but it should be understood that similar methods may be applied to other systems without departing from the scope of this disclosure. Method 200 may be carried out by control system 14, and may be stored at controller 12 in non-transitory memory. Instructions for carrying out method 200 may be executed by the controller 12 in conjunction with signals received from sensors of an engine system of the vehicle, such as the sensors described above with reference to FIG. 1. The controller may employ engine actuators of the engine system to adjust operation of an engine of the vehicle, according to the methods described below.

At 202, method 200 may include estimating engine and ambient conditions. Engine conditions may include engine temperature, engine load, and engine speed. As non-limiting examples, engine conditions may be estimated via a plurality of sensors, including a MAF sensor (such as MAF sensor 126 of FIG. 1) to measure engine load, a crankshaft position sensor to measure engine speed, and an engine coolant temperature sensor to measure engine temperature. Additionally, ambient temperature and humidity may be measured via ambient temperature and humidity sensors. Also, a DEF temperature may be estimated via a temperature sensor coupled to the DEF tank (such as tank temperature sensor 312 in FIGS. 3A-B).

At 204, method 200 may proceed to estimate the DEF volume (also referred herein as level) in the DEF tank. Estimation of the amount of liquid DEF in a DEF tank may be achieved through estimating a first height of the liquid contained within the DEF tank, and then utilizing the height estimation to determine the volume of liquid DEF contained within the DEF tank via a first transfer function. The first height of the liquid DEF may be estimated by a first sensor coupled to the DEF tank (as discussed further in relation to FIG. 3). As an example, the first sensor may be an ultrasonic transceiver, which may send an ultrasonic pulse to the surface of the liquid (at the air/liquid interface in the DEF tank), which may partially reflect off of the surface of the liquid, and based off of the time discrepancy between the emitted ultrasonic pulse and the received ultrasonic pulse which reflected off of the interface, may estimate the first height of the liquid DEF contained within the DEF tank. The volume of DEF in the tank and/or a distance to empty (DTE) the DEF tank (as estimated based on the volume of DEF in the tank and the tank capacity) may be indicated to an operator via an on-board instrument panel or a remote device.

The first height of the liquid may be used as an input parameter for a first transfer function. The first transfer function may be pre-calibrated based on a geometry and capacity of the DEF tank. The first transfer function may be distinct for each tank design. The first transfer function may be used to estimate DEF volume under conditions when the entire volume of DEF in the tank is in liquid state (without any portion being frozen). In one example, the first transfer function may be a mathematical function which may determine the volume of liquid contained within the DEF tank based off of the input first height and properties of the DEF tank design. In another example, the first transfer function may be a look-up table stored in the controller memory where the estimated first height of the DEF may be used as input to generate a volume of the DEF as output.

At 206, method 200 determines if DEF freezing conditions are met. DEF freezing conditions may include a temperature at the DEF tank below which the liquid DEF contained within the tank may be partially or entirely frozen. As a non-limiting example, typical compositions of DEF may have a freezing temperature of approximately −11 degrees Celsius. In one example, DEF freezing conditions within the DEF tank may be determined based on output of a temperature sensor placed within the DEF tank (as described further with respect to FIG. 3). In another example, temperature at the DEF tank may be estimated as a function of ambient temperature as obtained by an ambient temperature sensor.

If it is determined that freezing conditions are not met, it may be assumed that the entire volume of DEF is in liquid state and method 200 may proceed to 205, where the first transfer function is maintained for DEF liquid volume estimation. If it is determined that freezing conditions are met, it may be inferred that at least a portion of DEF in the tank may be frozen and method 200 may proceed to 208.

At 208, in order to thaw the frozen DEF, a tank heater (such as 145 in FIG. 1) may be activated. The controller may send a signal to the actuator of the heater to activate the heating element. For example, the power applied to the heating element may be determined based on the information obtained of the ambient temperature and/or internal tank. As one example, the power applied to the heater may be increased in response to an estimated decrease in ambient temperature below DEF freezing conditions, as obtained by an ambient temperature sensor. As another example, the power applied to the heater may be increased in response to an estimated decrease in internal temperature below DEF freezing conditions, as estimated by an internal temperature sensor (as described in relation to FIG. 3). After the tank heater is activated, method 200 may proceed to 210.

The heat form the heater may generate a characteristic substantially parabolic thawing profile (such as within 5% of a parabolic profile) of the DEF. The parabolic thawing pattern (as shown in FIGS. 3A-B) may be based on the power applied to the heater, the directional dependence of the heat energy radiated from the heater, and a duration of operating of the heater. The thawing pattern may be a characteristic of the heater and/or may be based on the design of the heater. The thawing induced be the heater may increase the amount of dispensable DEF liquid in the DEF tank for SCR.

At 210, method 200 may switch to estimation of DEF volume using a second transfer function. The second transfer function may be pre-calibrated based on a thawing pattern of liquid DEF caused by a heater (such as heater 145 of FIG. 1) coupled to the DEF tank. The thawing pattern of the frozen liquid DEF may depend on the heater characteristics. A particular heater design may leave a characteristic parabolic thawing pattern of the liquid DEF depending on the intensity, angular dependence of heat emanating from the heating element, and a duration of operation of the heater. The thawing pattern of the DEF contained within the DEF tank may be independent of the DEF tank design. In one example, the transition from the first transfer function to the second transfer function for estimation of DEF volume in the tank may be carried out if the DEF volume in the tank is higher than a threshold level prior to the freezing conditions. In one example, the threshold level may be 30% of the total DEF tank capacity. If the DEF volume in the tank is lower than the threshold level, the heater may be able to effectively thaw the entire DEF in the tank and maintain the entire volume of DEF in the tank in a liquid form.

At 212, method 200 may proceed to estimate a second height of liquid DEF contained within the DEF tank. The second height of the liquid DEF contained in the DEF tank may be estimated by a second sensor contained within the DEF tank, which may be placed directly above and proximal to the tank heater and the lower surface of the tank. As an example, the second sensor may be an ultrasonic transceiver, which may send an ultrasonic pulse to the surface of the liquid (at the air/liquid interface), which may partially reflect off of the surface of the liquid, and based off of the time discrepancy between the emitted ultrasonic pulse and the received ultrasonic pulse which reflected off of the surface, may estimate the second height of the liquid. If the liquid is not entirely thawed along the direction of the ultrasonic pulse and the ultrasonic pulse encounters a liquid/solid interface due to partial thawing, the signal may reflect off of the liquid/solid interface and the ultrasonic transceiver may determine the second height to be the distance from the transceiver to the liquid/solid interface.

At 214, method 200 may proceed to estimate the volume of liquid DEF contained within the DEF tank based on the second transfer function. The volume of liquid DEF contained within the DEF tank may be the amount of dispensable DEF for operation of an SCR system (such as SCR catalyst 129 of FIG. 1), and the second transfer function may be utilized to estimate the amount of dispensable liquid DEF for operation. As an example, the second transfer function may take several input parameters, such as the height of the DEF liquid as obtained from a second sensor, the power and time duration of the heater as applied in 210, and the temperature as measured by a temperature sensor contained within the DEF tank, and the ambient temperature as obtained in 202. In one example, the second transfer function may be a mathematical function which may determine the volume of liquid contained within the DEF tank based off of the second input height. In another example, the second transfer function may be a look-up table stored in the controller memory where the estimated second height of the liquid DEF may be used as input to generate a volume of the DEF as output.

Due to the freezing conditions, the DEF in the tank may freeze causing a sudden decrease in the volume of usable liquid DEF present in the tank. Since liquid DEF may be used at the SCR catalyst, freezing of the DEF may drastically reduce the amount of usable liquid left at the tank. The operator may be notified of the switch from the first transfer function to the second transfer function and the corresponding reduction in volume of DEF in the tank and/or a distance to empty (DTE) via the instrument panel or a remote device. During estimation of the available liquid DEF volume via the second transfer function, the DEF (reductant) injection to the SCR catalyst may be adjusted based on the estimated volume of the liquid DEF which is different from the total volume of DEF in the tank. In one example, the adjusting may include decreasing the rate of DEF injection as the volume of available liquid DEF is reduced At 216, method 200 may proceed to determine if the DEF freezing conditions are concluded. Conclusion of the DEF freezing condition may be determined based on output of the temperature sensor placed within the DEF tank and/or ambient temperature. As an example, the conclusion of freezing conditions may be confirmed by one or more of a higher than threshold DEF tank temperature and a higher than threshold ambient temperature. If the DEF freezing conditions persist (e.g. a lower than threshold DEF tank temperature and/or a lower than threshold ambient temperature), then method 200 may proceed to 218 to maintain the current heater operation. The method may then proceed to step 222.

If the freezing conditions are concluded, it may be inferred that the DEF may no longer freeze in the tank and further heating of the DEF may not be desired, and the method 200 may proceed to 220 to switch off the heater. As an alternative example, the heater may also be switched off at a higher temperature threshold than the DEF freezing condition, in order to ensure that heater operation does not fluctuate as the DEF tank temperature and/or ambient temperature hovers around the DEF freezing condition. As a non-limiting example, the temperature at which the heater is switched off after determining DEF freezing conditions are concluded may be 5% above the DEF freezing condition. The method may then proceed to step 222.

At 222, method 200 may include determining if the volume of liquid DEF as determined via the second transfer function is below a threshold volume of liquid DEF in the DEF tank. The threshold volume of DEF may be pre-calibrated based on a minimum volume of DEF suitable for operation of the SCR system. As an example, the threshold volume of DEF liquid in the DEF tank may be an amount of dispensable liquid for operation of the SCR system for a period of time. In a non-limiting example, the threshold volume of liquid DEF may be in a range of 20-25% of the capacity of the DEF tank. As an example, the DEF tank prior to any DEF liquid freezing may contain 50% tank capacity of DEF fluid, and after freezing and operation of the heater for a minimal amount of thawing time, may contain 40% tank capacity of dispensable DEF fluid, which may be larger than the threshold volume of DEF liquid. As another example, the DEF tank prior to any DEF liquid freezing may contain 30% tank capacity of DEF fluid, and after freezing and operation of the heater for a minimal amount of thawing time, may contain 20% tank capacity of dispensable DEF fluid, which may be lower than the threshold volume of DEF liquid. Therefore, during freezing conditions, the liquid, usable DEF volume may reduce to below the threshold level even if the total volume (solid and liquid combined) of DEF in the tank may be higher than the threshold level. If the volume of liquid DEF contained in the DEF tank as estimated via the second transfer function is higher than the threshold volume of DEF liquid, then method 200 may proceed to 226.

If it is determined that the volume of liquid DEF in the tank is lower than the threshold, at 224, a request for refill of the DEF liquid may be indicated. As an example, an indication for refilling the DEF may be shown to the operator via a message on the instrument panel or via a smart device (such as a smart phone). Following the request for a refill, method 200 may proceed to 226.

At 226, method 200 may determine if a refill event has occurred. A refill event may by constituted by a certain amount of DEF liquid being added to the DEF tank. In one example, a refill event may be confirmed by a higher than threshold increase in DEF volume as estimated via the second transfer function. As an example, the threshold increase may correspond to an increase of DEF volume to 70% of the tank capacity (such as at least 3.5 liters of liquid DEF in the tank). A refill event may occur in the presence or absence of freezing conditions even if a refill request was not made. The refill may be carried out at a service center by a technician. If a refill event is determined to have taken place, method 200 may proceed to 230 to switch the transfer function for DEF volume estimation within the DEF tank from the second transfer function to the first transfer function. After the refill, the volume of DEF in the tank may be estimated via the first transfer function. If a refill event is not determined to have taken place, method 200 may proceed to 228 to maintain the second transfer function for DEF volume indication within the DEF tank. Even if freezing conditions are no longer valid, in order to maintain continuity, DEF volume may be continued to be estimated via the second transfer function until a refilling event takes place.

FIG. 3A schematically depicts a first embodiment 300 of a first tank 302, and FIG. 3B schematically depicts a second embodiment 350 of a second tank 352. Each of the first tank 302 and the second tank 352 may be filled to an extent with DEF.

The first embodiment 300 of the first tank 302 may be rectangular shaped with a width of the tank higher than a height of the tank. However, such a design is exemplary and other designs, including tanks with curved walls and asymmetric shapes, may be possible. The first tank 302 may contain a tank heater 304, coupled to the bottom (floor) of the first tank 302. The tank heater 304 may be the same or significantly similar to tank heater 145 of FIG. 1. As an example, the heater 304 may be placed at the geometric center of the bottom of the tank, in order to optimize the distribution of heat for thawing of frozen DEF. The heater 304 may be external to the tank (such as in face sharing contact with the lower surface of the tank) or within the tank.

Additionally contained within the first tank 302 may be a plurality of sensors (as described in relation to FIG. 2). The sensors contained within the first tank 302 may include a first height sensor 314, which may estimate the height of liquid DEF within the first tank 302 during warmer ambient conditions (when the entire volume of DEF in the tank is in liquid state), a second height sensor 305, which may measure the height of liquid DEF directly above the heater 304 during DEF freezing conditions (when a portion of the DEF in the tank is frozen), and a tank temperature sensor 312 which may measure the temperature of the DEF in the tank. As an example, the first and second height sensors may be ultrasonic transceivers. An ultrasonic transceiver may operate by emitting ultrasonic pulses, which may then partially reflect off of an interface (such as a solid/air, liquid/air, or solid/liquid interface, corresponding to the frozen DEF/air, liquid DEF/air, and frozen DEF/liquid DEF interfaces, respectively). The reflected pulse may then be received by the ultrasonic transceiver, the ultrasonic transceiver then measuring the delay between the emitted signal and the received signal, and calculating the corresponding distance from the ultrasonic transceiver to the interface. The placement of the first height sensor 314 at the bottom of the tank may be distal to the heater 304. The placement of the second height sensor 305 may be directly above and proximal to the heater 304, in order to accurately estimate the height of liquid DEF directly above the heater 304.

The tank temperature sensor 312 may be placed at the bottom of the tank, and may measure the of the DEF in the tank which may be used to determine DEF freezing conditions. In alternate examples, the tank temperature sensor may be positioned on the wall of the tank above the volume of the DEF. Additionally or alternatively, as described previously in relation to 206, the freezing conditions may also be determined through estimation of the ambient temperature via an ambient temperature sensor.

After freezing conditions are indicated, the tank heater 304 may be turned on to thaw the frozen DEF. The thawing process of DEF contained within the first tank 302 is further depicted in FIG. 3A. As the DEF thaws into liquid, a portion of DEF in the first tank 302 may be frozen DEF 306, and the remainder portion of the DEF may be liquid DEF 307. The volume of DEF contained within the tank comprises a fraction of the tank, with the rest of the empty volume depicted as 308. As discussed in relation to 222, there may be a minimum threshold amount of dispensable liquid DEF 307 for optimal operation of an SCR system (such as SCR catalyst 129 of FIG. 1). In a non-limiting example, the threshold volume of liquid DEF may be in a range of 20-25% of the capacity of the DEF tank.

Emanating from the tank heater 304 is heat energy (shown schematically by arrows 301), which may induce a parabolic thawing pattern of the DEF liquid directly above the heater 304. As an example, the thawing pattern may approximate a parabolic profile to within 5%. The thawed liquid DEF 307 contained within the parabolic thawing pattern has a characteristic height $h_{l1}$ as measured to the top of the liquid surface from the bottom of the tank, while the remaining frozen DEF 306 contained outside of the parabolic thawing pattern has a characteristic height $h_{s1}$ as measured to the top of the frozen (solid) surface from the bottom of the tank. As an example, the heights $h_{l1}$ and $h_{s1}$ may be approximately the same, as depicted in the figure. As another example, the height $h_{l1}$ of the thawed liquid DEF 307 as measured from the base of the heater may be less the height $h_{s1}$ of the frozen DEF 306, as the thaw pattern induced by the heater may not make it all the way to the DEF/air interface near the top of the first tank 302.

Prior to DEF freezing conditions, the volume of DEF contained within the first tank 302 may be estimated via a first transfer function, which may be pre-calibrated to the design specifications of the first tank 302. The first transfer function may take a first height as input, which may be determined by the first height sensor 314, and may provide liquid DEF volume as output.

During DEF freezing conditions, the volume of dispensable DEF contained within the first tank 302 may be estimated via a second transfer function. The second transfer function may be pre-calibrated to the heater design, and may be independent of properties of the tank (such as the shape and size of the tank). In one example, the second transfer function may take several input parameters, including a second height of the DEF liquid as obtained from the second height sensor 305, the power and time duration of the heater prior to switching to the second transfer function, and the temperatures of the first tank 302, and may provide the liquid DEF volume as output. In another example, the second transfer function may take as input the second height as obtained by the second height sensor 305, and may provide the liquid DEF volume as output. The amounts of frozen DEF and dispensable liquid DEF may then be estimated via the second transfer function through the following equations:

$$V_L = f^*(h_{l1}), \quad (1)$$

$$V_S = V_{total} - V_L, \quad (2)$$

where $V_S$ is the total volume of solid (frozen) DEF 306 contained within the first tank 302, $V_{total}$ is the total liquid volume contained within the first tank 302 prior to freezing conditions, $V_L$ is the volume of liquid DEF 307, and $f^*(h_{l1})$ is the second transfer function, $h_{l1}$ is the height of thawed liquid as obtained by the second height sensor 305. Estimation of $V_{total}$ may be obtained via the first transfer function.

The second embodiment 350 of the second tank 352 is depicted in FIG. 3B. The second embodiment 350 of the second tank 352 may be rectangular shaped, with a width of the tank lower than a height of the tank. Additionally, the second tank 352 may be smaller than the first tank 302. As a non-limiting example, the second embodiment 350 of the second tank 352 is shown in FIG. 3B with approximately the same height as the first tank 302, but with a shortened width as compared to the first tank 302. However, such a design is exemplary and other designs, including tanks with curved walls, may be possible.

The second tank 352 may contain all of the same components or components that are significantly similar to all of the components of the first tank 302, including the first height sensor 314, the tank heater 304 coupled to the second tank 352 either externally (such as in face sharing contact with the lower surface or the tank) or within the tank, placed at the geometric center of the bottom of the tank, the second height sensor 305 placed directly above and proximal to the heater 304, the tank heater 304, and the tank temperature sensor 312. The relative placement of the plurality of sensors in relation to each other and in relation to the heater 304 may be the same for the first tank 302 and the second tank 352, except the first height sensor 314, which may be placed closer to the heater 304.

The tank temperature sensor 312 may be placed at the bottom of the tank, and may measure the temperature of the DEF in the tank which may be used to determine DEF freezing conditions. In alternate examples, the tank temperature sensor may be positioned on the wall of the tank above the volume of the DEF. Additionally or alternatively, as described previously in relation to 206, the freezing conditions may also be determined through estimation of the ambient temperature via an ambient temperature sensor.

After freezing conditions are indicated, the tank heater 304 may be turned on to thaw the frozen DEF. The thawing process of DEF contained within the second tank 352 is further depicted in FIG. 3B. As the DEF thaws into liquid, a portion of DEF in the second tank 352 may be frozen DEF 356 and the remainder portion of the DEF may be in liquid DEF 357. The volume of DEF contained within the tank comprises a fraction of the tank, with the rest of the empty volume depicted as 358. As discussed in relation to method 200 of FIG. 2, there may be a minimum threshold amount of dispensable liquid DEF 357 for optimal operation of an SCR system (such as SCR catalyst 129 of FIG. 1). In a non-limiting example, the threshold volume of liquid DEF may be in a range of 20-25% of the capacity of the DEF tank.

Emanating from the tank heater 304 is heat energy (shown schematically by arrows 301), which may induce a parabolic thawing pattern of the DEF liquid directly above the heater 304. As an example, the thawing pattern may approximate a parabolic profile to within 5%. The thawed liquid DEF 357 contained within the parabolic thawing pattern has a characteristic height $h_{l2}$ as measured to the top of the liquid surface from the bottom of the tank, while the remaining frozen DEF 356 contained outside of the parabolic thawing pattern has a characteristic height $h_{s2}$ as measured to the top of the frozen (solid) surface from the bottom of the tank. As an example, the heights $h_{l2}$ and $h_{s2}$ may be approximately the same, as depicted in the figure. As another example, the height $h_{l2}$ of the thawed liquid DEF 357 as measured from the base of the heater may be less the height $h_{s2}$ of the frozen DEF 356, as the thaw pattern induced by the heater may not make it all the way to the DEF/air interface near the top of the second tank 352.

As shown in FIGS. 3A-B, the thawing pattern induced by the heater 304 in the first tank 302 and the second tank 352 may be significantly similar; however, the amount of remaining frozen DEF 306 of the first tank 302 may be larger than the amount of remaining frozen DEF 356 of the second tank 352, due to the reduced width of the second tank 352 as compared to the first tank 302. Hence, the fraction of dispensable liquid DEF 357 to frozen DEF 356 in the second tank 352 may be larger than the fraction of dispensable liquid DEF 307 to frozen DEF 306 in the first tank 302.

Prior to DEF freezing conditions, the volume of DEF contained within the second tank 352 may be estimated by a first transfer function as described in relation to FIG. 2, which may be pre-calibrated to the design specifications of the second tank 352. The first transfer function may take a first height as input, which may be determined by the first height sensor 314, and may provide liquid DEF volume as output.

During DEF freezing conditions, the volume of dispensable DEF contained within the second tank 352 may be estimated by a second transfer function, as described in relation to FIG. 2. The second transfer function may be pre-calibrated to the heater design, and may be independent of properties of the tank (such as the shape and size of the tank). In one example, the second transfer function may take several input parameters, including the second height of the DEF liquid as obtained from a second height sensor 305, the power and time duration of the heater prior to switching to the second transfer function, and the internal and ambient temperatures of the second tank 352, and may provide the liquid DEF volume as output. In another example, the second transfer function may take as input the second height as obtained by the second height sensor 305, and may provide the liquid DEF volume as output. The amounts of frozen DEF and dispensable liquid DEF may then be estimated via the second transfer function through the following equations:

$$V_L = f^*(h_{l2}), \qquad (3)$$

$$V_S = V_{total} - V_L, \qquad (4)$$

where $V_S$ is the total volume of solid (frozen) DEF 356 contained within the second tank 352, $V_{total}$ is the total liquid volume contained within the second tank 352 prior to freezing conditions, $V_L$ is the volume of liquid DEF 357, and $f^*(h_{l2})$ is the second transfer function as a function of the liquid height $h_{l2}$ as obtained by the second height sensor 305. Estimation of $V_{total}$ may be obtained via the first transfer function.

In this way, during DEF freezing conditions, for a first vehicle including the first DEF tank 302 with a first heater for thawing frozen DEF, the volume of liquid DEF in the first tank 302 may be estimated using a second transfer function and for a second vehicle including a second tank 352 with a second heater for thawing frozen DEF, the volume of liquid DEF in the second tank 352 may be estimated using the second transfer function. The first tank may be different in size and/or shape from the second tank while the first heater in the first tank may be identical to the second heater in the second tank. The second transfer function may be identical for the first vehicle and the second vehicle, the second transfer function based on the heating profile of the first heater and the second heater including a power delivered to respective heating elements of the first heater and the second heater. In an absence of DEF freezing conditions, for the first vehicle, the volume of liquid DEF in the tank 302 may be estimated using a first transfer function, and for the second vehicle, the level of liquid DEF in the second tank 352 may be estimated using a different first transfer function. The first transfer function is based on a size and shape of the first tank 302, while the other first transfer function is based on another size and shape of the second tank 352.

FIG. 4 shows an example timeline 400 for determining a volume of liquid DEF contained within a DEF tank (such as DEF tank 139 of FIG. 1 or DEF tanks 302 and 352 of FIG. 3) under cold ambient conditions. The horizontal (x-axis) denotes time and the vertical markers $t_1$-$t_3$ identify significant times in estimation of the volume of liquid DEF in the tank.

Timeline 400 includes a plot 402 of the temperature of DEF in the tank over time as measured by a DEF tank temperature sensor (such as tank temperature sensor 312 of FIG. 3). Dashed line 404 indicates a threshold temperature above which DEF freezes within the tank. Plot 406 shows a volume of liquid (e.g., volume of dispensable liquid) of DEF contained within the DEF tank over time. Dashed line 408 shows a threshold level of liquid DEF desired for suitable operation of an SCR system (such as SCR catalyst 129 of FIG. 1). Plot 410 shows a transfer function used for estimation of liquid DEF volume in the DEF tank, where the transfer function can be switched between a first transfer function for liquid DEF volume indication, and a second transfer function for liquid DEF volume indication based on presence or absence of freezing conditions. Plot 412 shows operation of a heater coupled to the DEF tank (such as heater 304 of FIG. 3), which may switch between an on state and an off state. Finally, timeline 400 includes plot 414 of an indicator showing whether or not a DEF refill request is made, which may alternate between no indication of a DEF refill request (i.e. 0 in the plot) and indication of a DEF refill request (i.e. 1 in the plot).

Prior to time $t_1$, the engine is in operation, and the temperature of DEF tank decreases from a given temperature of liquid DEF contained within the DEF tank due to cold ambient temperature conditions. Additionally, prior to time $t_1$, plot 406 may be reducing as the DEF is supplied as reagent for operation of the SCR catalyst. Since the tank temperature is above the threshold temperature, the entire volume of DEF in the tank is in liquid state and plot 412 may continue to indicate an off state. During this condition, the first transfer function is used to estimate the volume of DEF in the tank. Additionally, due to the higher than threshold DEF volume in the tank, the indication of a DEF refill request as shown in plot 414 is in an off state (i.e. 0).

At time $t_1$, plot 402 increases to above the dashed line 404 causing the DEF to freeze within the tank. Due to freezing of the DEF, the heater is activated to thaw the frozen DEF. In order to estimate a volume of thawed liquid DEF in the tank, the transfer function is switched from the first transfer function to the second transfer function. Henceforth, the volume of liquid, usable DEF in the tank is estimated based on an estimated height of the DEF in the tank and the second transfer function.

From time $t_1$ to time $t_2$, the temperature further decreases due to change in ambient conditions. Due to the accelerated freezing of the SEF even though the heater has been activated, the liquid DEF volume declines further.

At time $t_2$, due to freezing of the DEF, plot 406 decreases to below the threshold level as indicated by dashed line 408 of liquid DEF desired for suitable operation of an SCR system. In response to the volume of dispensable DEF liquid decreasing below the threshold level as indicated by dashed line 408, a refill request is made to the operator. The refill request is made via an indication on an on-board instrument panel and/or via a smart device.

From time $t_2$ to $t_3$, the DEF tank temperature continues to change such a decrease initially and then increase. The liquid DEF volume as indicated by plot 406 also decreases initially corresponding to the decrease in temperature. As the heater is being operated, thawing of the frozen DEF increases and, plot 406 begins to increase even though plot 402 continues to be below dashed line 404.

At time $t_3$, plot 402 increases above the dashed line 404 ending the DEF freezing conditions. In response to the higher than threshold DEF tank temperature, it may be inferred that the DEF may thaw without heat from the heater. Therefore, the heater is deactivated at time $t_3$. Due to the higher than threshold DEF tank temperature, the DEF continues to thaw and at time $t_4$, the liquid DEF volume increases to the threshold level as indicated by dashed line 408. In response to the liquid DEF volume increasing above the threshold level as indicated by dashed line 408, the refilling request is rescinded and the notification to the operator is removed. However, estimation of DEF liquid volume is continued to be carried out using the second transfer function until the next refueling event.

In this way, utilization of a second transfer function whose calibration depends on the design on the heater and is independent of the tank may have advantages. One advantage of utilizing a second transfer function for DEF freezing conditions is that the second transfer function may be independent of the DEF tank design, depending on the heater design, allowing for more widespread use in a fleet of vehicles with different tank shapes and sizes. A technical effect of using two separate transfer functions for DEF volume estimation during different temperature conditions is that a more accurate estimation of the amount of dispensable DEF liquid contained within a DEF tank may be carried out during a condition where a portion of the total DEF volume contained within the tank may be frozen. A more accurate estimation of the amount of dispensable DEF liquid contained within the tank during cold ambient conditions may allow for fewer erroneous faulty indications for a vehicle operator. Further, more accurate estimation of available DEF and consequently DTE may result in more accurate operation of the SCR catalyst.

In one example, a method to thaw diesel exhaust fluid in a vehicle, comprises: estimating a volume of liquid diesel exhaust fluid (DEF) in a tank for storing the DEF via a first function, and in response to freezing conditions in the tank, activating a heater coupled to the tank, and then transitioning to estimation of the volume of liquid DEF via a second function independent of a geometry and volume of the tank; and adjusting DEF injection based on the estimated volume of the liquid DEF. In any or all of the preceding examples, additionally or optionally, the estimation of the volume of liquid DEF in the tank via the first function is based on a first height of DEF in the tank as estimated via a first sensor in an absence of freezing conditions. In any or all of the preceding examples, additionally or optionally, operation of the heater thaws frozen DEF in the tank in a substantially parabolic profile regardless of a shape and size of the tank. In any or all of the preceding examples, additionally or optionally, the estimation of the volume of liquid DEF in the tank via the second function is based on a second height of thawed liquid DEF in the tank via a second sensor coupled to the heater. In any or all of the preceding examples, additionally or optionally, the second height is a distance between the heater and a top surface of thawed liquid DEF in the tank. In any or all of the preceding examples, additionally or optionally, the first function is pre-calibrated based on a size and shape of the tank, and wherein the second function is pre-calibrated based on a heating profile of the heater, the heating profile including an intensity of heat supplied by a heating element of the heater. In any or all of the preceding examples, additionally or optionally, in response to conclusion of freezing conditions, deactivating the heater while continuing estimation of volume of liquid DEF in the tank via the second function. In any or all of the preceding examples, additionally or optionally, in response to transitioning estimation of volume of liquid DEF via the second function, notifying an operator of a change in volume of liquid DEF, and in response to the volume of liquid DEF in the tank reducing to below a threshold volume, notifying the operator to refill the DEF tank. In any or all of the preceding examples, additionally or optionally, upon refill of DEF in the tank, transitioning estimation of volume of liquid DEF in the tank via the second function to estimation of the volume of liquid DEF via the first function. In any or all of the preceding examples, additionally or optionally, adjusting DEF injection includes adjusting a flow of liquid DEF injected to an exhaust passage upstream of a selective catalytic reduction (SCR) system via a pump.

In another example, a method comprises: during diesel exhaust fluid (DEF) freezing conditions, for a first vehicle including a first tank for DEF with a first heater for thawing frozen DEF, estimating a volume of liquid DEF in the tank using a second transfer function; and for a second vehicle including a second DEF tank with a second heater for thawing frozen DEF, estimating the volume of liquid DEF in the tank using the second transfer function, the first tank different in size and/or shape from the second tank while the first heater in the first tank is identical to the second heater in the second tank. In the preceding example, additionally or optionally, each of the first heater and the second heater are operated during freezing conditions to thaw frozen DEF in the first tank and the second tank respectively, a heating profile for the first heater identical to the heating profile of the second heater. In any or all of the preceding examples, additionally or optionally, the second transfer function is identical for the first vehicle and the second vehicle, the second transfer function based on the heating profile of the first heater and the second heater including a power delivered to respective heating elements of the first heater and the second heater. In any or all of the preceding examples, additionally or optionally, in absence of DEF freezing conditions, for the first vehicle, estimating the volume of liquid DEF in the first tank using a first transfer function, and for the second vehicle, estimating the volume of liquid DEF in the second tank using a different first transfer function. In any or all of the preceding examples, additionally or optionally, the first transfer function is based on a size and shape of the first tank, and the different first transfer function is based on another size and shape of the second tank. In any or all of the preceding examples, additionally or optionally, in the first vehicle, estimating the volume of liquid DEF using the second transfer function includes estimating a first height of liquid relative to the first heater via a first ultrasonic sensor coupled to the first heater, and then estimating a volume of liquid DEF based on the first height and the second transfer function; and wherein in the second vehicle, estimating the volume of liquid DEF using the second transfer function includes estimating a second height of liquid relative to the second heater via a second ultrasonic sensor coupled to the second heater, and then estimating a volume of liquid DEF based on the second height and the second transfer function.

In yet another example, a system for an engine comprises: a selective catalytic reduction (SCR) system; a tank housing diesel exhaust fluid (DEF) for delivery to the SCR system; and a controller storing instructions in non-transitory memory that, when executed, cause the controller to: during a first condition, estimating a volume of DEF in the tank based on a first height of liquid DEF relative to a base of the tank and a first transfer function, the first transfer based on a geometry of the tank; and during a second condition, estimating the volume of DEF in the tank based on a second height of liquid DEF relative to a heater and a second transfer function, the second transfer function independent of the geometry of the tank. In the preceding example, additionally or optionally, the first condition includes one or more of a higher than threshold tank temperature and a higher than threshold ambient temperature, and wherein the second condition includes one or more of a lower than threshold tank temperature and a lower than threshold ambient temperature. In any or all of the preceding examples, additionally or optionally, during the second condition, the controller includes further instructions to: activate the heater coupled to a base of the tank to thaw frozen DEF in the tank, the heater thawing the DEF in a parabolic pattern regardless of a shape and size of the tank. In any or all of the preceding examples, additionally or optionally, the first height is estimated via a first ultrasonic transducer coupled within the DEF tank, and wherein the second height is estimated via a second ultrasonic transducer coupled to the heater.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during a liquid diesel exhaust fluid (DEF) in freezing conditions,
   for a first vehicle including a first tank for storing the liquid DEF with a first heater for thawing frozen DEF, estimating a volume of the liquid DEF in the first tank using a freezing conditions transfer function during freezing in the first tank, and using a first non-freezing conditions transfer function specific to the first vehicle during non-freezing conditions; and
   for a second vehicle including a second tank for storing the liquid DEF with a second heater for thawing frozen DEF, estimating a volume of the liquid DEF in the second tank using the freezing conditions transfer function during freezing in the second tank, and using a second non-freezing conditions transfer function specific to the second vehicle during non-freezing conditions, the first tank is different in size and/or shape from the second tank while the first heater in the first tank is identical to the second heater in the second tank, wherein the freezing conditions transfer function is identical for the first vehicle and the second vehicle.

2. The method of claim 1, wherein each of the first heater and the second heater are operated during freezing conditions to thaw frozen DEF in the first tank and the second tank respectively, a heating profile for the first heater identical to the heating profile of the second heater.

3. The method of claim 2, wherein the freezing conditions transfer function is based on the heating profile of the first heater and the second heater including a power delivered to respective heating elements of the first heater and the second heater.

4. The method of claim 1, wherein the first non-freezing conditions transfer function is based on a size and shape of the first tank, and the second non-freezing conditions transfer function is based on another size and shape of the second tank.

5. The method of claim 1, wherein in the first vehicle, estimating the volume of the liquid DEF using the freezing conditions transfer function includes estimating a first height of liquid DEF relative to the first heater via a first ultrasonic sensor coupled to the first heater, and then estimating the volume of liquid DEF based on the first height and the first non-freezing conditions transfer function specific to the first vehicle; and
   wherein in the second vehicle, estimating the volume of the liquid DEF using the freezing conditions transfer function includes estimating a second height of liquid DEF relative to the second heater via a second ultrasonic sensor coupled to the second heater, and then estimating the volume of liquid DEF based on the second height and the second non-freezing conditions transfer function specific to the second vehicle.

* * * * *